(12) United States Patent
Tian

(10) Patent No.: US 11,450,903 B2
(45) Date of Patent: Sep. 20, 2022

(54) BATTERY MODULE AND SURFING APPARATUS HAVING THE SAME

(71) Applicant: YUJET INTERNATIONAL CORPORATION LIMITED, Central (HK)

(72) Inventor: Yu Tian, Hong Kong (HK)

(*) Notice: Subject to any disclaimer, the term of this patent is extended or adjusted under 35 U.S.C. 154(b) by 0 days.

(21) Appl. No.: 16/033,063

(22) Filed: Jul. 11, 2018

(65) Prior Publication Data

US 2019/0173138 A1    Jun. 6, 2019

(30) Foreign Application Priority Data

Dec. 6, 2017 (CN) .......................... 201711279895.7

(51) Int. Cl.
| | |
|---|---|
| *H01M 10/613* | (2014.01) |
| *H01M 10/6567* | (2014.01) |
| *H01M 10/6551* | (2014.01) |
| *H01M 10/48* | (2006.01) |
| *H01M 50/20* | (2021.01) |
| *H01M 50/249* | (2021.01) |
| *H01M 50/291* | (2021.01) |
| *H01M 50/296* | (2021.01) |
| *H01M 50/298* | (2021.01) |
| *H01M 50/213* | (2021.01) |

(52) U.S. Cl.
CPC ....... *H01M 10/613* (2015.04); *H01M 10/482* (2013.01); *H01M 10/486* (2013.01); *H01M 10/6551* (2015.04); *H01M 10/6567* (2015.04); *H01M 50/20* (2021.01); *H01M 50/213* (2021.01); *H01M 50/249* (2021.01); *H01M 50/291* (2021.01); *H01M 50/296* (2021.01); *H01M 50/298* (2021.01)

(58) Field of Classification Search
CPC ......... H01M 10/6551; H01M 10/6557; H01M 10/655; H01M 10/6556; B63B 35/7943
USPC ....................................... 429/120, 7
See application file for complete search history.

(56) References Cited

U.S. PATENT DOCUMENTS

| | | | | |
|---|---|---|---|---|
| 7,678,493 | B2 * | 3/2010 | Morita ................. | H01M 2/202 429/100 |
| 2008/0168937 | A1 * | 7/2008 | Ruan ................... | B63B 35/7943 114/55.56 |
| 2009/0004553 | A1 * | 1/2009 | Nakamura .......... | H01M 2/1077 429/54 |

(Continued)

FOREIGN PATENT DOCUMENTS

| | | | | |
|---|---|---|---|---|
| DE | 3627931 | A1 * | 3/1988 | ............ B63H 21/17 |
| EP | 2290728 | A1 * | 3/2011 | ........ H01M 10/6555 |

(Continued)

*Primary Examiner* — Gregg Cantelmo
(74) *Attorney, Agent, or Firm* — WPAT Law, P.C.; Anthony King

(57) ABSTRACT

The present disclosure relates to a battery module and a surfing apparatus having the same. The battery module includes a housing and a plurality of cells arranged in the housing, wherein a bottom surface of the housing is provided with one or a plurality of heat dissipation grooves. The surfing apparatus includes the battery module. By virtue of the plurality of heat dissipation grooves arranged on the bottom surface of the housing, the heat dissipation performance of the battery module is improved. The battery module of the surfing apparatus has better heat dissipation performance.

20 Claims, 6 Drawing Sheets

(56) References Cited

U.S. PATENT DOCUMENTS

| | | | |
|---|---|---|---|
| 2010/0221591 A1* | 9/2010 | Roßkamp | H01M 2/1022 429/99 |
| 2011/0201238 A1* | 8/2011 | Rott | B63B 35/7943 440/6 |
| 2014/0045024 A1* | 2/2014 | Waters | H01M 2/1061 429/99 |
| 2016/0093870 A1* | 3/2016 | DeKeuster | H01M 2/364 429/89 |
| 2016/0126601 A1* | 5/2016 | Ichikawa | H02J 7/0047 374/152 |
| 2016/0197323 A1* | 7/2016 | DeKeuster | H01M 2/1072 429/82 |

FOREIGN PATENT DOCUMENTS

| | | | | |
|---|---|---|---|---|
| JP | 2006134801 A | * | 5/2006 | |
| JP | 2010282811 A | * | 12/2010 | |
| JP | 2011049012 A | * | 3/2011 | H01M 10/613 |

\* cited by examiner

BATTERY MODULE AND SURFING APPARATUS HAVING THE SAME

CROSS-REFERENCE TO RELATED APPLICATIONS

This application claims foreign priority to China Pat. Application No. 201711279895.7 filed on Dec. 6, 2017, now pending, which is hereby incorporated by reference in their entirety.

TECHNICAL FIELD

The present disclosure relates to a battery module and a surfing apparatus having the same.

BACKGROUND

Conventional batteries generally generate heat during use. Particularly, when the battery supplies power to an electronic device having a high power, a large amount of heat may be typically generated. Therefore, heat dissipation for the battery needs to be enhanced.

SUMMARY

To solve the technical problem of heat dissipation in the prior art, the present disclosure provides a battery module featuring well heat dissipation performance, and a surfing apparatus having the same.

According to the present disclosure, the above technical problem is solved by using the following technical solutions:

A battery module is provided. The battery module includes: a housing and a plurality of cells arranged within the housing;

wherein a bottom surface of the housing is provided with one or a plurality of heat dissipation grooves.

In this embodiment, by virtue of the plurality of heat dissipation grooves arranged on the bottom surface of the housing, the heat dissipation performance of the battery module is improved.

Optionally, a plurality of receiving portions are defined in the housing, the plurality of cells are respectively arranged in the plurality of receiving portions, and the heat dissipation groove is arranged between two adjacent receiving portions.

In this embodiment, by virtue of the plurality of receiving portions, the cells are arranged in groups, such that heat generated in each group of cells may be dissipated by using the heat dissipation groove arranged between two adjacent groups of cells.

Optionally, a spacer portion is arranged between two adjacent receiving portions, and the heat dissipation groove is recessed from the bottom surface of the housing and is defined in the spacer portion.

Optionally, the plurality of heat dissipation grooves all extend along the same direction.

In the present disclosure, the heat dissipation grooves extend along the same direction, which facilitate heat dissipation along the same direction.

Optionally, the heat dissipation groove extends from a first side surface of the housing towards a second side surface opposite to the first side surface.

Optionally, the heat dissipation groove fails to reach the second side surface.

In this embodiment, the heat dissipation groove fails to penetrate through the housing, such that the strength of the housing is ensured, and a wire terminal and a battery protection plate may be conveniently arranged.

Optionally, the battery module further includes a fixing plate, wherein the fixing plate is regularly provided with a plurality of fixing holes, and each of the cells is inserted into the fixing hole.

In the present disclosure, by virtue of the arranged fixing plate, the plurality of cells are regularly arranged, such that wiring and effective heat dissipation of the cells are facilitated.

Optionally, the cell is a columnar cell.

In the present disclosure, by virtue of selecting the columnar cells as the cells, the cells are more conveniently arranged.

Optionally, the heat dissipation groove is recessed from the bottom surface of the housing, wherein a bottom surface of the heat dissipation groove is proximate to a top surface of the housing.

In the present disclosure, the heat dissipation groove is set to be sufficiently deep, such that the heat may be effectively dissipated.

Optionally, the bottom surface of the housing is provided with a wiring hole, the wiring hole being provided with a wire terminal, wherein the cell is connected to the wire terminal.

In this embodiment, by virtue of the arranged wiring hole, the battery may be simply connected to an electrical product in a plug-in manner.

Optionally, the wiring hole is proximate to the second side surface.

In this embodiment, the wiring hole proximate to the second side surface facilitate connection to an external electrical product.

Optionally, the battery module further includes a battery protection plate, wherein the battery protection plate is arranged inside the housing, and the battery protection plate is electrically connected between the wire terminal and the cell.

In the present disclosure, the battery protection plate may prevent the battery module from over-charge, over-discharge, over-current, short circuit or super high-temperature charge and discharge.

Optionally, the battery module further includes a conductive sheet, wherein the battery protection plate is electrically connected to the cell via the conducive sheet.

Optionally, the conducive sheet is a nickel sheet.

Optionally, the conductive sheet is connected to the battery protection plate via a cable.

Optionally, the battery module further includes a trapezoid part and a square part, wherein a side of the square part coincides with a bottom side of the trapezoid, the cell is arranged within the square part, and the wire terminal and the battery protection plate are arranged within the trapezoid part.

In the present disclosure, the battery module is designed to the above shape, such that the internal space of the housing may be fully utilized and that the battery module becomes small in size.

Optionally, a top surface of the housing is provided with a handle.

In the present disclosure, by virtue of the handle arranged on the top surface of the housing, the battery may be conveniently lifted up.

Optionally, the housing is of a sealed structure.

In the present disclosure, by defining the housing to a sealed structure, water or moisture or external foreign substances are prevented from entering the housing and thus damaging the cell.

Optionally, a top surface of the housing is provided with a display, wherein the display is connected to the battery protection plate to indicate power of the battery module.

Optionally, the display is inserted into a through hole on the top surface of the housing, a temperature sensor arranged at a lower part of the display, and the display is electrically connected to the temperature sensor to indicate temperature inside the battery module.

the display is inserted into a through hole on the top surface of the housing, a humidity sensor arranged at a lower part of the display, and the display is electrically connected to the humidity sensor to indicate whether moisture enters the battery module.

Optionally, the battery module further includes an alarm, wherein the alarm is electrically connected to the humidity sensor.

In the present disclosure, the display may timely indicate detail conditions inside the battery module. If the moisture enters the battery module, the alarm may time generate an alarm.

Optionally, the housing is filled with thermal conductive oil.

In the present disclosure, by filling the thermal conductive oil in the housing, the heat generated by the cells may be led to the housing, such that the heat is dissipated outside the battery module.

A surfing apparatus is further provided. The surfing apparatus includes the above described battery module.

The benefits of the present disclosure lie in that:

By virtue of the plurality of heat dissipation grooves arranged on the bottom surface of the housing, the heat dissipation performance of the battery module is improved. The battery module of the surfing apparatus has better heat dissipation performance.

Figure 1:
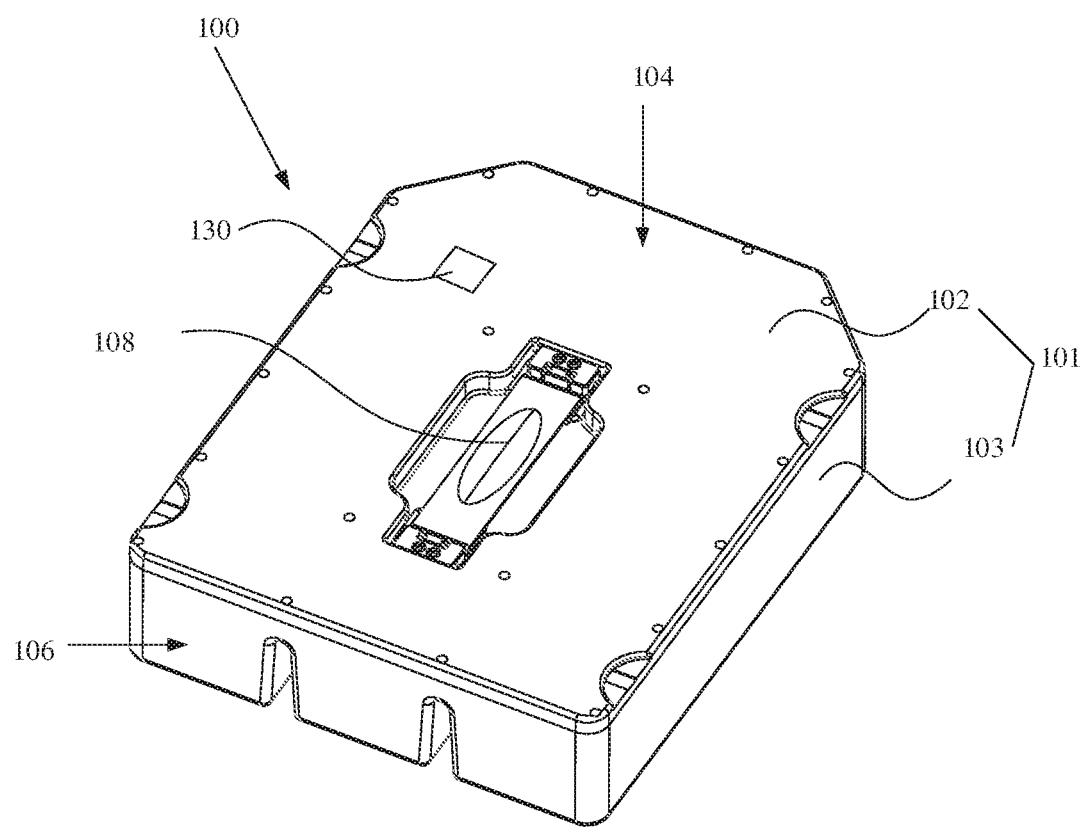
FIG. 1 is a three-dimensional structural diagram of a battery module according to a preferred embodiment of the present disclosure.
Figure 2:
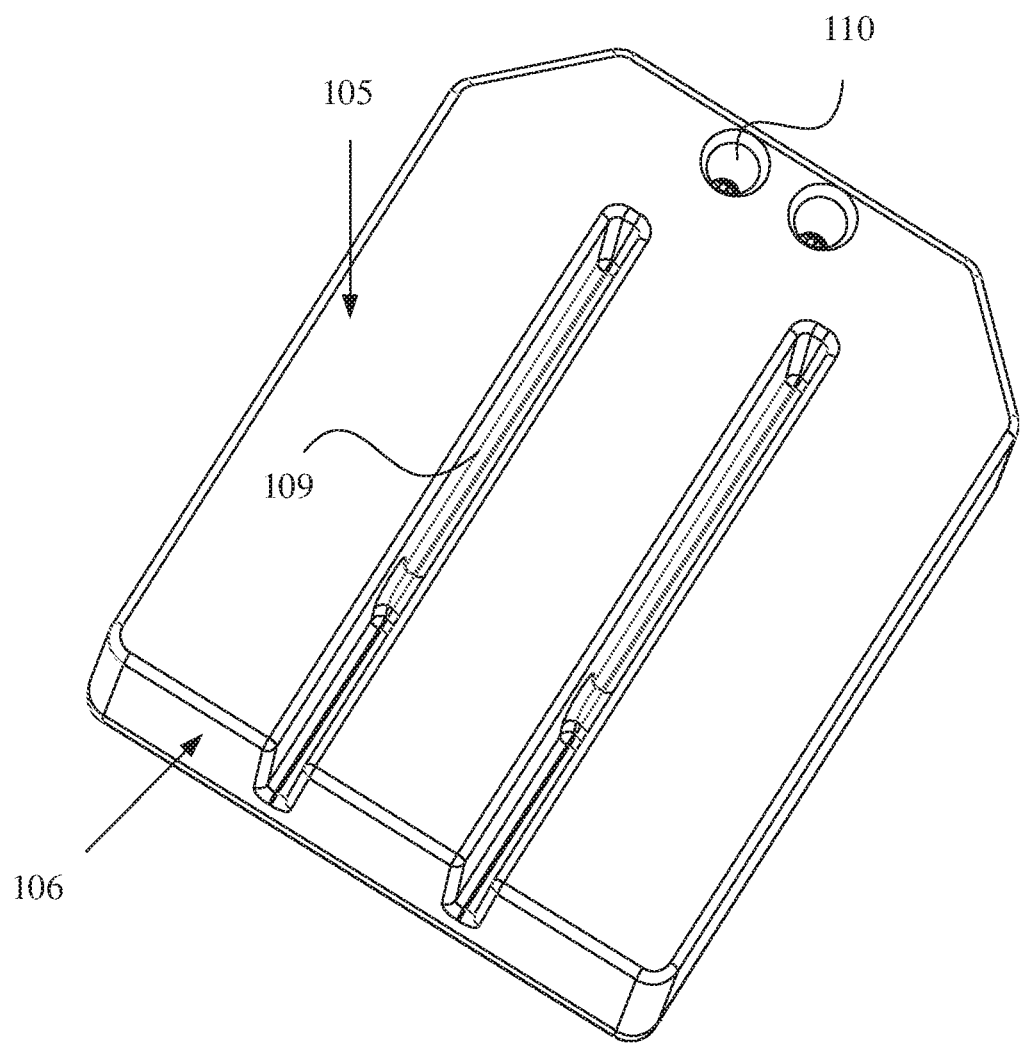
FIG. 2 is another three-dimensional structural diagram of the battery module according to a preferred embodiment of the present disclosure.

Reference numerals and denotations thereof:

Battery module 100
Housing 101
Upper cover 102
Body 103
Top surface 104
Bottom surface 105
First side surface 106
Second side surface 107
Handle 108
Heat dissipation groove 109
Wiring hole 110
Spacer portion 111
Receiving portion 112
Cell 120
Nickel sheet 121
Fixing plate 122
Fixing hole 123
Battery protection plate 124
Display 130

DETAILED DESCRIPTION

Hereinafter the present disclosure is further described with reference to the accompanying drawings and the embodiments. However, the present disclosure is not limited to the scope as defined by the embodiments described.

As illustrated in FIG. 1 to FIG. 4, a battery module 100 includes: a housing 101 and a plurality of cells 120 arranged in the housing 101.

The housing 101 includes an upper cover 102 and a body 103. A top surface 104 of the housing 101 is located on the upper cover 102. A bottom surface 105 of the housing 101 is located on the body 103. The housing 101 is of a sealed structure, and the upper cover 103 is engaged on the body 102 via a sealer ring, such that the housing 101 defines a sealed structure. As such, water or moisture or external foreign substances are prevented from entering the housing and thus damaging the cells.

The housing 101 is filled with thermal conductive oil. By filling the thermal conductive oil in the housing, the heat generated by the cells may be led to the housing, such that the heat is dissipated outside the battery module.

Figure 3:
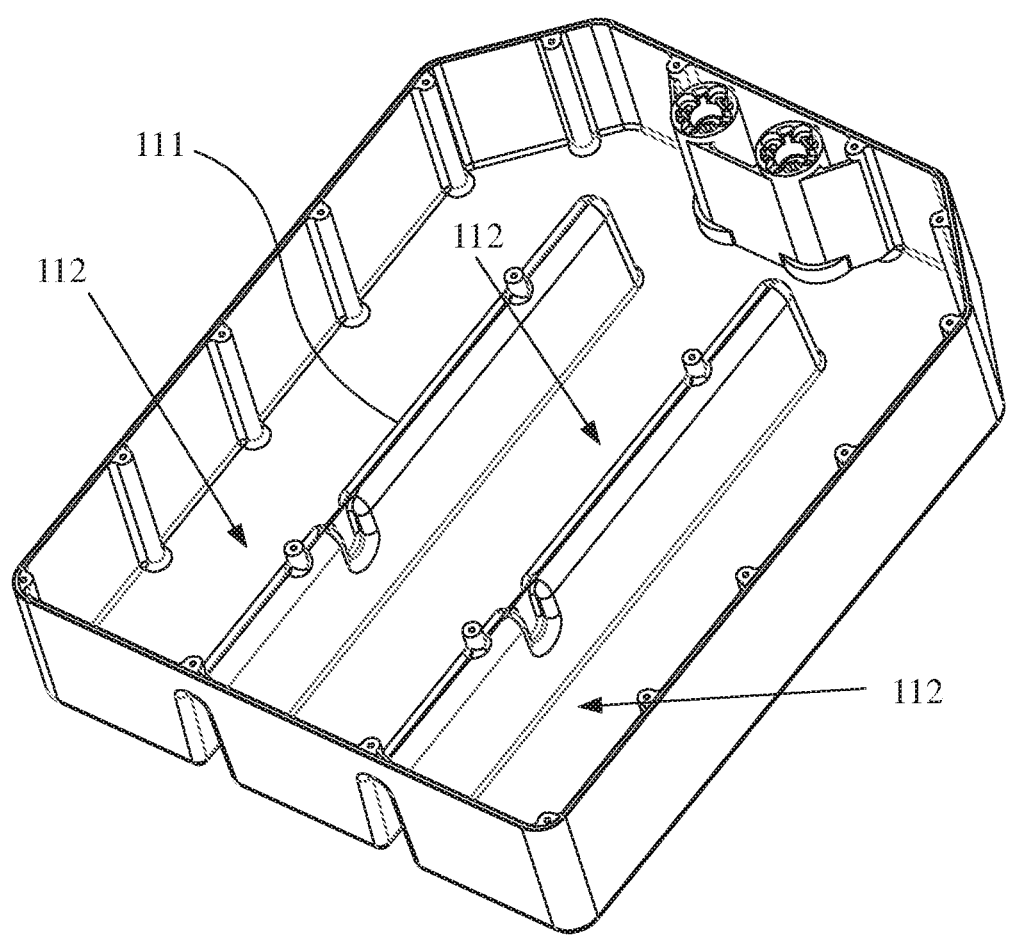
FIG. 3 is a partial structural diagram of a housing according to a preferred embodiment of the present disclosure.
Figure 4:
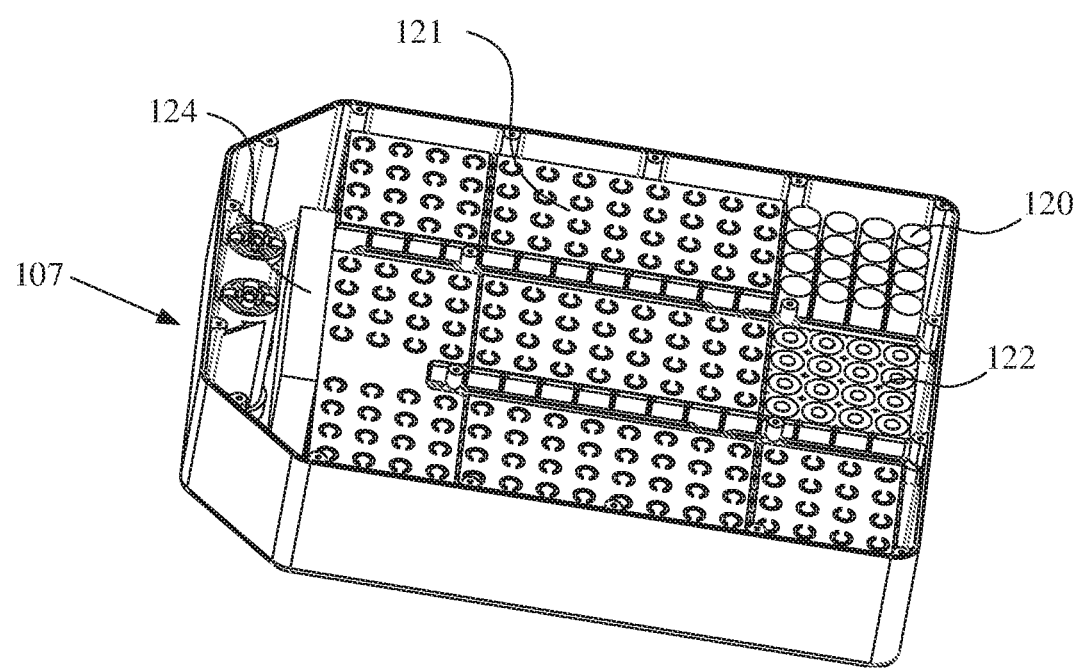
FIG. 4 is an internal structural diagram of the battery module according to a preferred embodiment of the present disclosure.

For better description of the present disclosure, FIG. 3 merely illustrates the body 103, and as illustrated in FIG. 4, the upper cover 102, and a part of the nickel sheets 121 and fixing plates 122 are removed.

The top surface 104 of the housing 101 is provided with a handle 108. By virtue of the handle 108 arranged on the top surface 104, the battery module may be conveniently lifted up. The bottom surface 105 of the housing 101 is provided with one or a plurality of heat dissipation grooves 109. Gas or liquid or the like fluid medium may pass through the heat dissipation groove 109, to remove the heat generated in the battery module 100.

A plurality of receiving portions 112 are defined in the housing 101, and the plurality of cells 120 are respectively arranged in the plurality of receiving portions 112, and the heat dissipation groove 109 is arranged between two adjacent receiving portions 112. In this embodiment, description is given using three receiving portions 112 as an example. The number of receiving portions 112 may also be set according to the actual needs.

A spacer portion 111 is arranged between any two adjacent receiving portions 112, and the heat dissipation groove 109 is recessed from the bottom surface 105 of the housing 101 and defined in the spacer portion 111.

The plurality of heat dissipation grooves 109 all extend along the same direction. The heat dissipation groove 109 extends from a first side surface 106 of the housing 101 towards a second side surface 107 opposite to the first side surface 106. The heat dissipation groove 109 fails to reach the second side surface 107. The heat dissipation groove 109 fails to penetrate through the housing 101, such that the strength of the housing 101 is ensured, and a wire terminal and a battery protection plate 124 may be conveniently arranged.

As illustrated in FIG. 3, the heat dissipation groove 109 is recessed from the bottom surface 105 of the housing 101, wherein a bottom surface of the heat dissipation groove 109 is proximate to the top surface 104 of the housing 101. As such, the heat dissipation groove 109 may be sufficiently deep to make a large space for heat dissipation.

The heat dissipation groove 109 is further provided with a connection portion configured to connect two opposite side faces of the heat dissipation groove 109, and the connection portion is further configured to enhance the strength of the housing 101.

The battery module 100 further includes a fixing plate 122, a nickel sheet 121, a wire terminal, and a battery protection plate 124.

In this embodiment, the cell 120 is a columnar cell. Optionally, the cell 120 may also be a sheet-like cell or a cell in any other shape.

Figure 5:
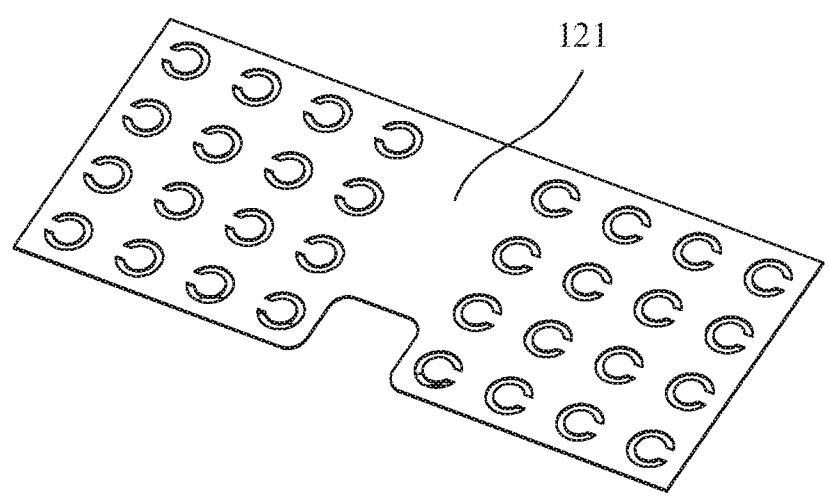
FIG. 5 is a three-dimensional structural diagram of a nickel sheet according to a preferred embodiment of the present disclosure.
Figure 6:
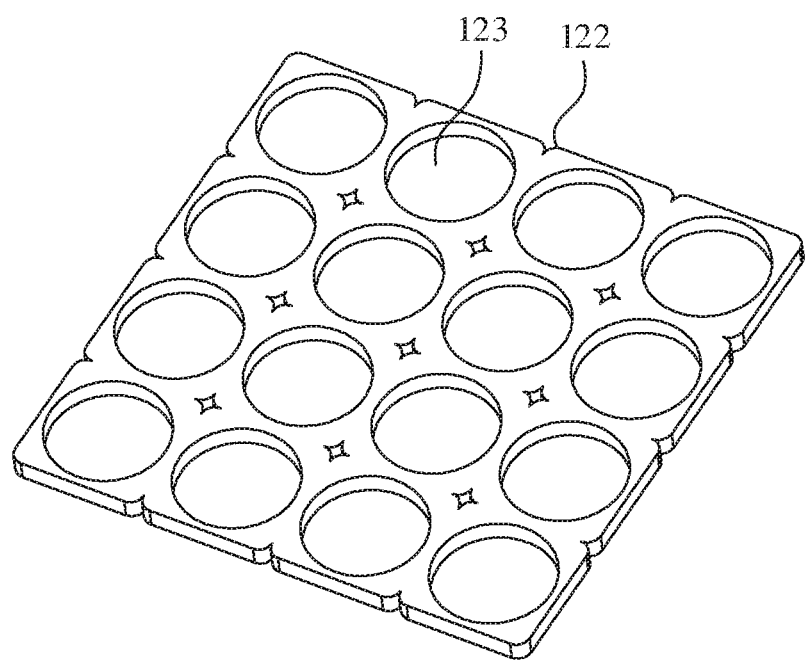
FIG. 6 is a three-dimensional structural diagram of a fixing plate according to a preferred embodiment of the present disclosure.

As illustrated in FIG. 5 to FIG. 6, the fixing plate 122 is regularly provided with a plurality of fixing holes 123, and each cell 120 is inserted into one fixing hole 123. In this embodiment, the fixing holes 123 are arranged to form a rectangular shape. Optionally, the fixing holes 123 may also be arranged to form a triangular shape, a circular shape, an elliptical shape or any other shape. Optionally, the fixing holes 123 may also be irregularly arranged.

The shape of the fixing hole 123 adapts to the shape of the cell 120. The cells 120 are integrally arranged in the receiving portion 112 based on an arrangement manner of the fixing holes 123. By virtue of the arranged fixing plate 122, the plurality of cells 120 are regularly arranged, such that wiring and effective heat dissipation of the cells 120 are facilitated.

A plurality of nickel sheets 121 are covered on the fixing plate 122, and the plurality of nickel sheets 121 are configured to lead out a positive pole or a negative pole of the cell 120. The nickel sheet 121 is electrically connected to the battery protection plate 124 via a cable (not illustrated in the drawings). The battery protection plate 124 is arranged inside the housing 101, and electrically connected to the wire terminal. The battery protection plate 124 may prevent the battery module 100 from over-charge, over-discharge, over-current, short circuit or super high-temperature charge and discharge.

The bottom surface 105 of the housing 101 is provided with a wiring hole 110. The wire terminal is arranged in the wiring hole 110.

By virtue of the arranged wiring hole 110, the battery may be simply connected to an electrical product in a plug-in manner.

The wiring hole 110 is proximate to the second side surface 107.

In this embodiment, by virtue of the nickel sheet 121, the positive pole or the negative pole of the cell 120 may be led out. Optionally, the nickel sheet 121 may also be replaced by a conductive sheet made of another material.

Referring to FIG. 4, the housing 101 is arranged to a particular shape, and includes a trapezoid part and a square part. A side of the square part coincides with a bottom side of the trapezoid part. The cells 120 are arranged in the square part and neatly distributed. The wire terminal and the battery protection plate 124 are both arranged in the trapezoid part. The battery module 100 is designed to the above shape. As such, the internal space of the housing 101 may be fully utilized, such that the internal structure of the battery module 100 is more compact, and the battery module 100 becomes small in size.

As illustrated in FIG. 1, the top surface 104 of the housing 101 is provided with a display 130. The display 130 is electrically connected to the battery protection plate to indicate power of the battery module. The display 130 is a display screen.

The display 130 is inserted into a through hole on the top surface 104 of the housing 101, and a temperature sensor is arranged at a lower part of the display 130. The display 130 is electrically connected to the temperature sensor to indicate temperature inside the battery module 100.

The display 130 is inserted into a through hole on the top surface 104 of the housing 101, and a humidity sensor is arranged at a lower part of the display 130. The display 130 is electrically connected to the humidity sensor to indicate whether moisture enters the battery module 100.

The battery module 100 further includes an alarm. The alarm is electrically connected to the humidity sensor. The alarm may be a sound generating device.

The display 130 may timely indicate detail conditions inside the battery module 100. If the moisture enters the battery module 100, the alarm may time generate an alarm.

A surfing apparatus is further provided. The surfing apparatus includes the above described battery module 100. When the battery module 100 is used in the surfing apparatus, sea water flowing through the surfing apparatus may be led to the heat dissipation groove 109, such that the sea water flows through the heat dissipation groove 109 and thus remove the heat generated in the battery module 100.

In the description of the present disclosure, it should be understood that the terms "upper", "lower", "front", "rear", "left", "right", "vertical", "horizontal", "top", "bottom", "inner", "outer" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

Although the specific embodiments of the present disclosure are described hereinabove, these embodiments are merely illustrated as examples, and the protection scope of the present disclosure is defined by the appended claims. A person skilled in the art may make various variations or modifications to these embodiments without departing from the principle and essence of the present disclosure. However, such variations or modifications shall all fall within the protection scope of the present disclosure.

What is claimed is:

1. A battery module, comprising: a housing and a plurality of cells arranged in the housing;
   wherein a bottom surface of the housing is provided with one or a plurality of heat dissipation grooves;
   wherein the bottom surface of the housing is provided with a wiring hole, the wiring hole being provided with a wire terminal, wherein the plurality of cells is connected to the wire terminal;
   a battery protection plate, wherein the battery protection plate is arranged inside the housing, and the battery protection plate is electrically connected between the wire terminal and the plurality of cells; and
   a trapezoid part and a square part, wherein a side of the square part coincides with a bottom side of the trapezoid, the plurality of cells is arranged within the square part, and the wire terminal and the battery protection plate are arranged within the trapezoid part.

2. The battery module according to claim 1, wherein a plurality of receiving portions is defined in the housing, the plurality of cells is respectively arranged in the plurality of receiving portions, and the one or a plurality of heat dissipation grooves is arranged between two adjacent receiving portions.

3. The battery module according to claim 2, wherein a spacer portion is arranged between two adjacent receiving portions, and the one or a plurality of heat dissipation grooves is recessed from the bottom surface of the housing and is defined in the spacer portion.

4. The battery module according to claim 1, wherein the one or a plurality of heat dissipation grooves all extend along the same direction.

5. The battery module according to claim 1, wherein the one or a plurality of heat dissipation grooves extends from a first side surface of the housing towards a second side surface opposite to the first side surface.

6. The battery module according to claim 5, wherein the one or a plurality of heat dissipation grooves fails to reach the second side surface.

7. The battery module according to claim 1, further comprising a fixing plate, wherein the fixing plate is regularly provided with a plurality of fixing holes, and each of the cells is inserted into the fixing hole.

8. The battery module according to claim 1, wherein each cell in said plurality of cells is a columnar cell.

9. The battery module according to claim 1, wherein the one or a plurality of heat dissipation grooves are recessed from the bottom surface of the housing, wherein a bottom surface of the one or each one in a plurality of heat dissipation grooves is proximate to a top surface of the housing.

10. The battery module according to claim 1, wherein the wiring hole is proximate to a second side surface of the housing.

11. The battery module according to claim 1, further comprising a conductive sheet, wherein the battery protection plate is connected to the plurality of cells via the conducive sheet.

12. The battery module according to claim 11, wherein the conducive sheet is a nickel sheet.

13. The battery module according to claim 11, wherein the conductive sheet is connected to the battery protection plate via a cable.

14. The battery module according to claim 1, wherein a top surface of the housing is provided with a handle.

15. The battery module according to claim 1, wherein the housing is of a sealed structure.

16. The battery module according to claim 1, wherein a top surface of the housing is provided with a display, wherein the display is connected to the battery protection plate to indicate power of the battery module.

17. The battery module according to claim 16, wherein the display is inserted into a through hole on the top surface of the housing, a temperature sensor arranged at a lower part of the display, and the display is electrically connected to the temperature sensor to indicate temperature inside the battery module.

18. The battery module according to claim 16, wherein the display is inserted into a through hole on the top surface of the housing, a humidity sensor arranged at a lower part of the display, and the display is electrically connected to the humidity sensor to indicate whether moisture enters the battery module.

19. The battery module according to claim 18, further comprising an alarm, wherein the alarm is electrically connected to the humidity sensor.

20. The battery module according to claim 1, wherein the housing is filled with thermal conductive oil.

* * * * *